(12) United States Patent
Oitaira

(10) Patent No.: US 9,864,562 B2
(45) Date of Patent: Jan. 9, 2018

(54) DISPLAY CONTROL DEVICE AND DISPLAY CONTROL METHOD

(71) Applicant: Kabushiki Kaisha Toshiba, Tokyo (JP)

(72) Inventor: Hitoshi Oitaira, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 14/625,545

(22) Filed: Feb. 18, 2015

(65) Prior Publication Data
US 2015/0160914 A1 Jun. 11, 2015

Related U.S. Application Data

(63) Continuation of application No. PCT/JP2013/058834, filed on Mar. 26, 2013.

(51) Int. Cl.
*G06F 3/14* (2006.01)
*G06F 3/0481* (2013.01)
(Continued)

(52) U.S. Cl.
CPC ............ *G06F 3/1454* (2013.01); *G06F 3/038* (2013.01); *G06F 3/0481* (2013.01);
(Continued)

(58) Field of Classification Search
CPC .......... G06F 3/14; G06F 3/038; G06F 3/0484; G06F 3/0481
See application file for complete search history.

(56) References Cited

U.S. PATENT DOCUMENTS 8,723,823 B2 * 5/2014 Shia ........................ G06Q 10/10
345/173
2006/0195800 A1 8/2006 Tahara
(Continued)

FOREIGN PATENT DOCUMENTS

JP H02287615 11/1990
JP H07222130 8/1995
(Continued)

OTHER PUBLICATIONS

Japanese Application No. 2015-507747—Office Acton dated Mar. 29, 2016 with English Translation.
(Continued)

*Primary Examiner* — David Choi
(74) *Attorney, Agent, or Firm* — Blakely Sokoloff Taylor & Zafman LLP

(57) ABSTRACT

According to one embodiment, a display control device includes a receiving module, a transmission module, a reception module, and a display processor. The receiving module is configured to receive an operation on a first cursor represented on screen information received from an information processing device via a network when the screen information is displayed. The transmission module is configured to transmit positional information on a second cursor making the first cursor move in accordance with the operation received by the receiving module. The reception module is configured to receive screen information after the positional information on the second cursor is transmitted from the information processing device. The display processor is configured to superimpose and display the second cursor having been moved in accordance with the operation received by the receiving module, on the screen information representing the first cursor, and turns the second cursor into a hidden state when displaying the screen information, after the positional information on the second cursor is transmitted, received by the reception module.

10 Claims, 13 Drawing Sheets

(51) Int. Cl.
*G06F 9/44* (2006.01)
*G06F 3/038* (2013.01)
*G06F 3/0484* (2013.01)

(52) U.S. Cl.
CPC ........ *G06F 3/0484* (2013.01); *G06F 3/04812* (2013.01); *G06F 9/4445* (2013.01); *G09G 2354/00* (2013.01); *G09G 2370/16* (2013.01)

(56) References Cited

U.S. PATENT DOCUMENTS

| | | | | |
|---|---|---|---|---|
| 2009/0300510 | A1* | 12/2009 | Gantman | G06F 3/0481 715/740 |
| 2010/0042924 | A1* | 2/2010 | Kim | H04N 21/235 715/716 |
| 2011/0161849 | A1* | 6/2011 | Stallings | G06F 3/0488 715/768 |
| 2012/0030595 | A1* | 2/2012 | Itahana | G06F 3/04817 715/765 |
| 2015/0160914 | A1* | 6/2015 | Oitaira | G06F 3/0481 715/761 |

FOREIGN PATENT DOCUMENTS

| | | |
|---|---|---|
| JP | 2001-159944 | 6/2001 |
| JP | 2002-015140 | 1/2002 |
| JP | 2002-229917 | 8/2002 |
| JP | 2005140656 | 6/2005 |
| JP | 2005301767 | 10/2005 |
| JP | 2006-236046 | 9/2006 |

OTHER PUBLICATIONS

International Search Report from corresponding PCT/JP2013/058834 application.

\* cited by examiner

DISPLAY CONTROL DEVICE AND DISPLAY CONTROL METHOD

CROSS-REFERENCE TO RELATED APPLICATIONS

This application is a continuation of International Application No. PCT/JP2013/058834, filed on Mar. 26, 2013, the entire contents of which are incorporated herein by reference.

FIELD

Embodiments described herein relate generally to display control devices and display control methods.

BACKGROUND

Conventionally, there has been known techniques that enable transmission of screen data displayed on a certain communication device to a separate display device in a wired or wireless manner and cause the separate display device to display the received screen data. For example, screen data including the result of operation performed with a pointing device connected to the communication device on a transmission side is transmitted to the display device on a reception side. Consequently, a user referring to the display device on the reception side can check the operation performed on the communication device on the transmission side.

In recent years, it has been increasingly desirable that a screen be operated also on a display device on the reception side of video data. In response, a technique has been developed that enables, with a pointing device (for example, a mouse) connected to a display device on the reception side of screen data, coordinate information on a cursor representing the operation performed on the display device to be transmitted to a communication device on the transmission side of the screen data. Consequently, the communication device can reflect the result of operation performed on the display device on the screen data. However, when such processing is performed, there occurs a delay in reflecting the result of operation on the screen after the operation of the user. This makes the operation difficult.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a display control device comprises a receiving module, a transmission module, a reception module, and a display processor. The receiving module is configured to receive an operation on a first cursor represented on screen information received from an information processing device via a network when the screen information is displayed. The transmission module is configured to transmit positional information on a second cursor making the first cursor move in accordance with the operation received by the receiving module. The reception module is configured to receive screen information after the positional information on the second cursor is transmitted from the information processing device. The display processor is configured to superimpose and display the second cursor having been moved in accordance with the operation received by the receiving module, on the screen information representing the first cursor, and turns the second cursor into a hidden state when displaying the screen information, after the positional information on the second cursor is transmitted, received by the reception module

First Embodiment

In a first embodiment, described is an example in which a personal computer (PC) is used as a communication device that transmits screen information and a television display device is used as a display control device that displays the received screen information. However, the device may be any device as long as it is capable of performing communication with other devices and comprises a display.

Figure 1:
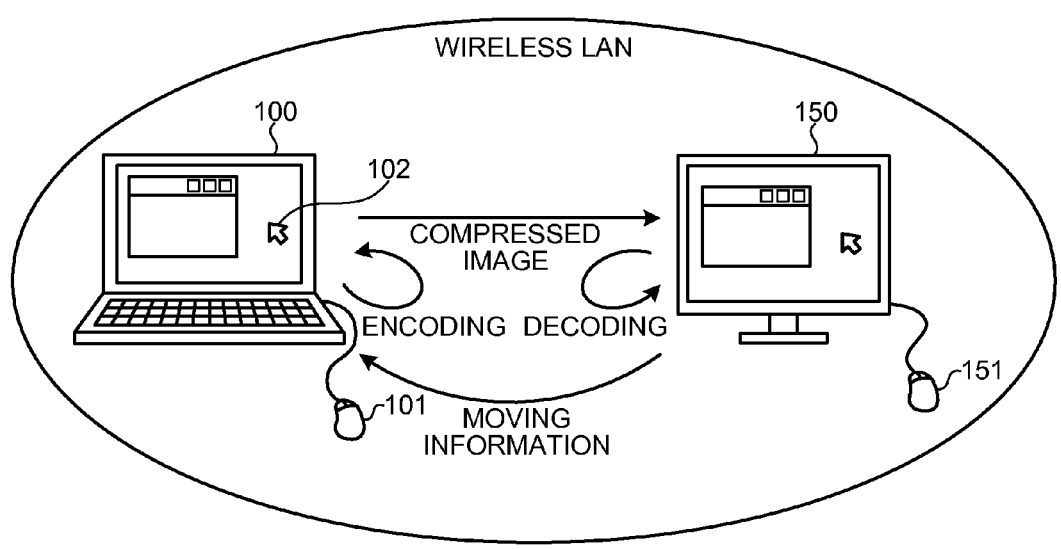
FIG. 1 is an exemplary diagram illustrating an outline of wireless LAN screen transfer according to a first embodiment.

FIG. 1 is a diagram illustrating an outline of wireless LAN screen transfer (Wi-Fi screen transfer) according to the first embodiment. FIG. 1 illustrates an example comprising an information processing device 100 as a transmission side (source side) and a television display device 150 as a reception side (sink side). In the screen transfer using a wireless LAN performed in the first embodiment, the information processing device 100 encodes screen data to be displayed and transmits the encoded data to the television display device 150. The television display device 150 then displays the decoded data on a display after decoding the received screen data.

In the first embodiment, when wireless communication is performed between the information processing device 100 and the television display device 150, the connection is made in accordance with the wireless LAN standard of IEEE 802.11n. However, the connection method is not limited to this, and the connection may be made in accordance with another communication standard. The communication may be not wireless communication but wired communication. In the first embodiment, when the connection is made, the information processing device 100 and the television display device 150 are directly connected to each other for communication therebetween without an access point (AP) relaying the connection. However, a communication method employing an access point that relays the connection may be used. As a wireless communication method that provides point-to-point or point-to-multipoint connection without the use of an access point, Wi-Fi Direct is used in the first embodiment. The Wi-Fi Direct is a wireless communication method that has been standardized by Wi-Fi Alliance, and thus its explanation is omitted.

While an example in which a PC is used as the information processing device 100 is described in the first embodiment, it is not limited to a PC, and a handheld communication terminal such as a tablet-type communication terminal and smartphone may be used.

To the information processing device 100, a pointing device 101 is connected. With this, the operation of a cursor 102 displayed on a screen can be performed. The result of operation is then reflected on the screen of the information processing device 100, and is also reflected on the screen of the television display device 150 that is the destination transmitting the screen data.

Furthermore, to the television display device 150 also, a pointing device 151 is connected. Then, the coordinate information on a cursor operated with the pointing device 151 (for example, a mouse pointer) is transmitted to the information processing device 100. The information processing device 100 then reflects the operation result based on the received coordinate information, on the screen of the information processing device 100, and transmits the screen data, on which the operation result has been reflected, to the television display device 150. Consequently, the operation result of the pointing device 151 can be referred to on the television display device 150 also.

However, between when the information processing device 100 received coordinate information and when the coordinate information is displayed on the television display device 150, encoding of the screen data by the information processing device 100 and decoding of the screen data by the television display device 150 are included. The encoding (for example, H.264 encoding) and decoding (for example, H.264 decoding) used in the first embodiment take time for processing.

Consequently, a delay is caused between when the operation is performed in the television display device 150 and when the operation result is displayed on the television display device 150. Thus, when the user performs operation while browsing the television display device 150, the user may not be able to perform desired operation, an example of which is the cursor (mouse pointer) stopping at a position deviated from the position at which the cursor is originally intended to stop. Hence, the television display device 150 in the first embodiment provides improved operability by displaying a cursor (mouse pointer) different from the cursor included in the screen data.

Figure 2:
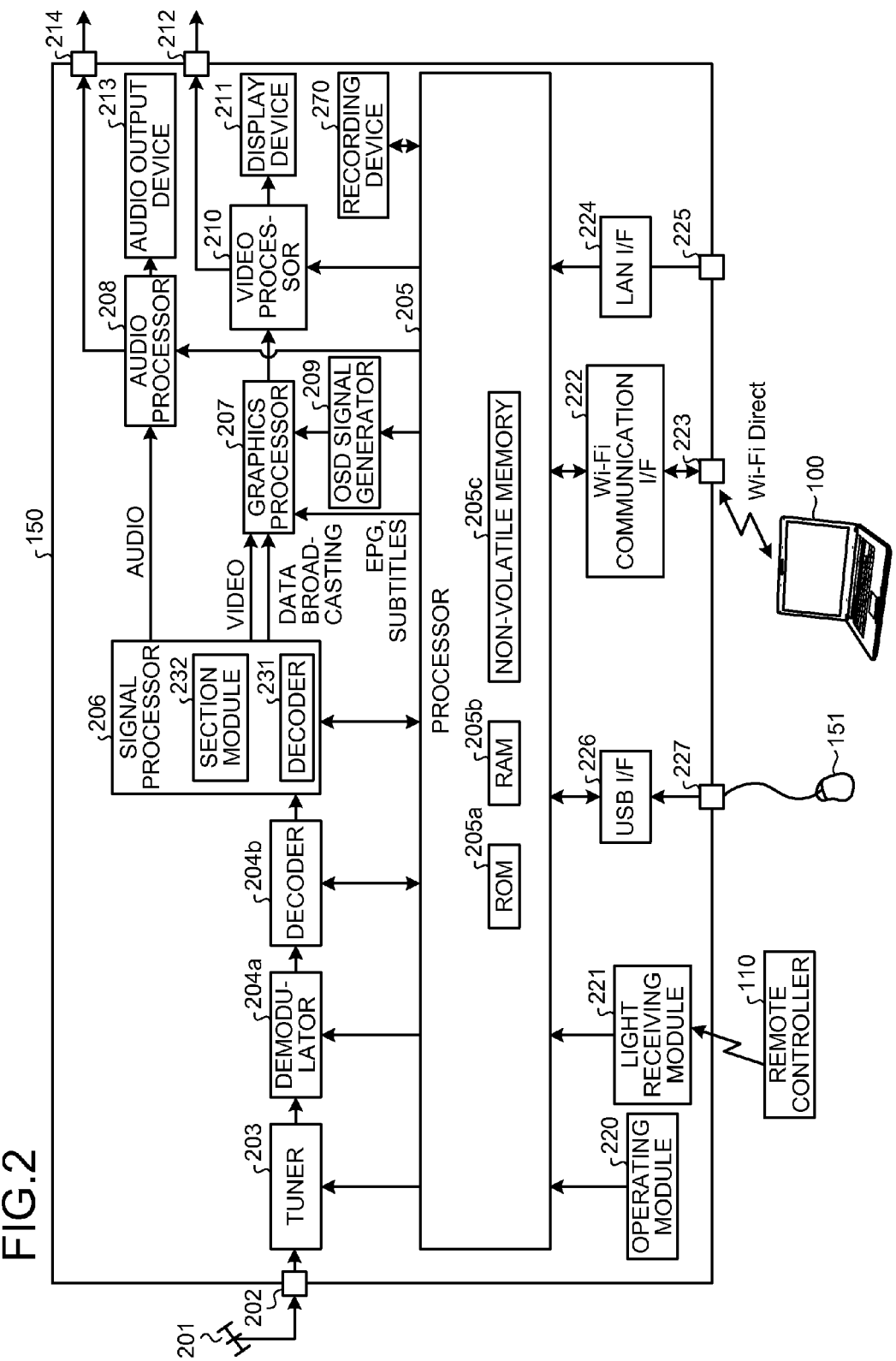
FIG. 2 is an exemplary diagram illustrating the hardware configuration of a television display device in the first embodiment.

FIG. 2 is a diagram illustrating the hardware configuration of the television display device 150. FIG. 2 is a block diagram illustrating a principal signal processing system of the television display device 150.

As illustrated in FIG. 2, on the television display device 150, an antenna 201 for receiving broadcast waves is connected on its input side, and the user can perform the operation of the television display device 150 via an operating module 220 provided on the television display device 150, and other than that, can perform the operation directly on an external display device and an external audio output device via a remote controller 110 by infrared communication.

The television display device 150 is configured to display broadcast programs by decoding a received digital television broadcasting signal such that the user can view the received broadcast programs. The television display device 150 is further configured such that the user can view the broadcast programs by using an external display device and an external audio output device, and can also record the received broadcast programs.

The television display device 150 illustrated in FIG. 2 may comprise a receiving circuit such as a plurality of tuners for receiving broadcast waves.

A terrestrial digital television broadcasting signal that is received with the antenna 201 for receiving terrestrial wave broadcasting is supplied to a tuner 203 for terrestrial digital broadcasting via an input terminal 202.

The tuner 203 selects a broadcasting signal for a desired channel based on a control signal from a processor 205, and outputs the selected broadcasting signal to a demodulator 204a.

The demodulator 204a, based on the control signal from the processor 205, demodulates the broadcasting signal selected by the tuner 203, obtains a transport stream including a desired program, and outputs the stream to a decoder 204b.

The decoder 204b, based on the control signal from the processor 205, performs transport stream (TS) decoding processing on the TS multiplexed signal and outputs a packetized elementary stream (PES), which is obtained by de-packetizing a digital video signal and a digital audio signal of the desired program, to an STD buffer in a signal processor 206. The decoder 204b further outputs section information broadcasted through digital broadcasting to a section module 232 in the signal processor 206.

The signal processor 206 comprises a decoder 231 and the section module 232 and performs processing on the inputted signals.

The decoder 231, at the time of television viewing, selectively performs given digital signal processing on the digital video signal and audio signal supplied from the decoder 204b, and outputs the signals to a graphics processor 207 and an audio processor 208. At the time of recording a program, the decoder 231 records, on a recording device (for example, an HDD) 270 via the processor 205, signals obtained by selectively performing given digital signal processing on the digital video signal and audio signal supplied from the decoder 204b.

The decoder 231, at the time of replaying a recorded program, performs given digital signal processing on the data of the recorded program read out from the recording device (for example, an HDD) 270 via the processor 205, and outputs the signals to the graphics processor 207 and the audio processor 208.

Furthermore, at the time of displaying a display screen of the information processing device 100, the decoder 231 performs given digital processing on the data received from the information processing device 100 via the processor 205, and outputs the resultant data to the graphics processor 207 and the audio processor 208.

On the processor 205, a variety of data (such as key information for B-CAS descrambling) for acquiring programs, electronic program guide (EPG) information, program attribute information (such as program genres), subtitle information (service information, SI, and PSI), and the like are inputted from the signal processor 206. The processor 205 performs image generation processing for displaying EPG and subtitles from the inputted information, and outputs the generated image information to the graphics processor 207.

Furthermore, the processor 205 has a function to control program recording and timer program recording. At the time of receiving timer recording of a program, the processor 205 displays the electronic program guide (EPG) information on a liquid crystal display of a display device 211, and according to the input of the user via the operating module 220 or the remote controller 110, sets the content of schedule in a given storage module. The processor 205 then controls the tuner 203, the demodulator 204a, the decoder 204b, and the signal processor 206 so as to record the program scheduled to be timer-recorded at a specified time.

The section module 232 outputs, out of the section information received from the decoder 204b, the variety of data for acquiring programs, the electronic program guide (EPG) information, the program attribute information (such as program genres), the subtitle information (service information, SI, and PSI), and the like to the processor 205.

The graphics processor 207 has a function of combining (1) a digital video signal supplied from the decoder 231 in the signal processor 206, (2) an on-screen display (OSD) signal generated in an OSD signal generator 209, (3) image data by data broadcasting, and (4) EPG and subtitles generated by the processor 205, and outputting the resultant data to a video processor 210. When displaying subtitles by closed-captioned broadcasting, the graphics processor 207 further performs, based on subtitle information controlled by the processor 205, the process of superimposing the subtitle information on a video signal.

The digital video signal outputted from the graphics processor 207 is supplied to the video processor 210. The video processor 210 transforms the inputted digital video signal to an analog video signal that is displayable on a liquid crystal display, and then outputs the signal to the display device 211 to display a video on the liquid crystal display of the display device 211. The video processor 210 can further output, to an external display device (not depicted) via an output terminal 212, a video signal that is in a format displayable on the display device to display the video thereon.

The above-described audio processor 208 transforms the inputted digital audio signal to an analog audio signal that can be replayed on an audio output device 213, and then outputs the signal to the audio output device 213 to replay the audio. The audio processor 208 can further output, to an external audio output device (not depicted) via an output terminal 214, an audio signal that is in a format that can be replayed on the audio output device to replay the audio thereby.

In the television display device 150, all of its operations including the various receiving operations in the foregoing is comprehensively controlled by the processor 205. The processor 205 comprises a built-in central processing unit (CPU) and other built-in components, and by receiving the operating information from the operating module 220 or receiving the operating information transmitted from the remote controller 110 via a light receiving module 221, controls the various modules such that the operation content (such as channel switching operation) is reflected.

In this case, the processor 205 primarily uses a read only memory (ROM) 205a that stores therein a control program that the CPU of the processor 205 executes, a random access memory (RAM) 205b that provides the CPU with a work area, and a non-volatile memory 205c such as a flash memory that stores therein various setting information, control information, program information, and the like.

Furthermore, the processor 205 is connected to a wireless LAN terminal 223 via a Wi-Fi communication I/F 222. With this, the processor 205 can perform information transmission with a LAN compatible device (for example, the information processing device 100) connected to the wireless LAN terminal 223 via a wireless communication line and the Wi-Fi communication I/F 222. Thus, the Wi-Fi communication I/F 222 and the wireless LAN terminal 223 enable the processor 205 to perform communication with a communication device such as the information processing device 100 via a wireless communication line. In the first embodiment, the information processing device 100 and the television display device 150 are directly connected via Wi-Fi Direct between them.

The processor 205 is further connected to a wired LAN terminal 225 via a LAN I/F 224. With this, the processor 205 can perform information transmission with various devices connected to the wired LAN terminal 225 via a wired network based on IEEE 802.3 (CSMA/CD) communication standard through the LAN I/F 224.

The processor 205 is further connected to a USB terminal 227 via a USB I/F 226. With this, the processor 205 can perform operation with the pointing device 151 connected to the USB terminal 227.

Figure 3:
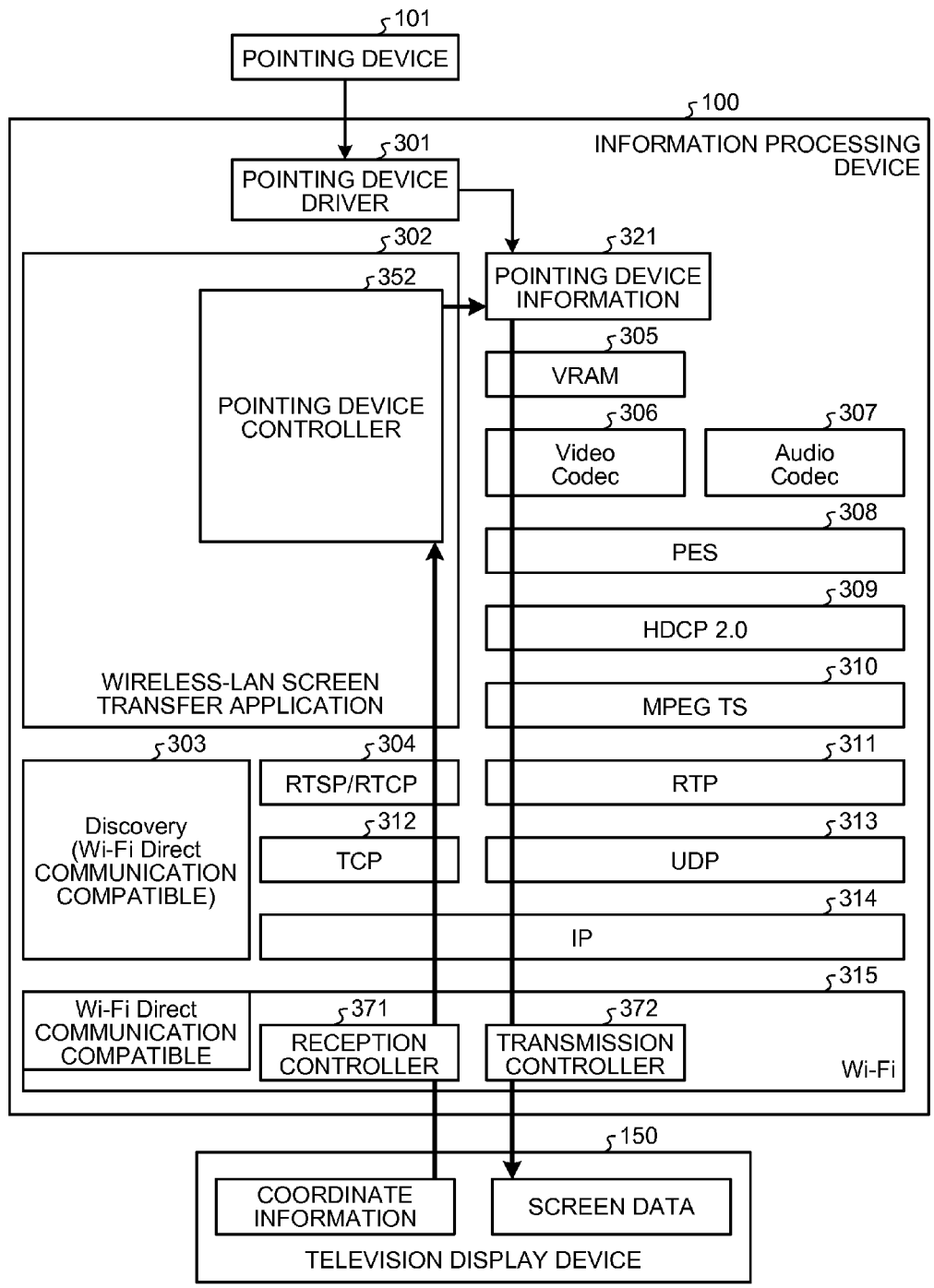
FIG. 3 is an exemplary diagram illustrating the structure of a communication protocol stack of an information processing device in the first embodiment.

FIG. 3 is a diagram illustrating the structure of a communication protocol stack of the information processing device 100 in the first embodiment. As illustrated in FIG. 3, the information processing device 100 comprises a pointing device driver 301 to make the pointing device 101 usable. In the information processing device 100, in a lower hierarchy than the pointing device driver 301, a group of software for transferring screen data via a wireless LAN is provided in a hierarchical manner.

As illustrated in FIG. 3, the information processing device 100 comprises, as the group of software, a wireless-LAN screen transfer application 302, a discovery layer 303, an RTSP/RTCP layer 304, a VRAM 305, a video_codec layer 306, an audio_codec layer 307, a PES layer 308, an HDCP_2.0 layer 309, an MPEG_TS layer 310, an RTP layer 311, a TCP layer 312, a UDP layer 313, an IP layer 314, and a Wi-Fi (IEEE 02.11n) layer 315. Besides, "layer" and "_" are omitted in FIG. 3.

For example, the real-time transport protocol (RTP) layer 311 performs communication by a communication method standardized in RFC 3550.

The real-time streaming protocol (RTSP)/RTP control protocol (RTCP) layer 304 is defined as a protocol for remotely controlling a communication device connected via wireless communication. In the first embodiment, the RTSP is used as a wireless LAN screen transfer control protocol. This protocol is a protocol obtained by adding functions for wireless LAN screen transfer to a protocol based on RFC 2326. The added functions include a function of transferring coordinate information on a cursor together with the screen.

The information processing device 100 in the first embodiment uses the RTSP/RTCP (TCP) as the control protocol in screen transfer, and uses the RTP (UDP) as a video transmission protocol. As for the other layers, they are the same as the layers used for normal communication processing, and thus explanations thereof are omitted.

Pointing device information 321 includes, for example, the position on the screen of the pointing device 101 connected to the information processing device 100. In the pointing device information 321, in response to a request from a pointing device controller 352, the position of the cursor is updated with the coordinate information received from the television display device 150.

The pointing device information 321 further includes, other than the position on the screen, image data representing the shape of the cursor on the screen.

The VRAM 305 stores therein image data that the information processing device 100 displays on the display. The image data also represents the cursor information (based on the pointing device information 321) that points the position coordinates on the screen. The image data is then displayed on the display of the information processing device 100, and after being encoded, is transmitted to the television display device 150 (sink device).

The video_codec layer 306 encodes the image data stored in the VRAM 305 to transmit the image data to the television display device 150.

The audio_codec layer 307 encodes audio data outputted in the information processing device 100 to transmit to the television display device 150.

Subsequently, each piece of software included in the group of software illustrated in FIG. 3 transforms the information inputted from the upper layer into a format appropriate for communication and outputs it to the lower layer of the software. Each piece of software further transforms the information inputted from the lower layer into a form appropriate for the upper layer and outputs it to the upper layer of the software.

The discovery layer 303 is a layer to detect a communication device available for wireless communication, and supports Wi-Fi Direct communication.

The Wi-Fi (IEEE802.11n) layer 315 is a layer to perform wireless communication, comprises a reception controller 371 and a transmission controller 372, and supports Wi-Fi Direct communication.

The transmission controller 372 performs transmission control of information to other communication devices (for example, the television display device 150) by wireless communication. The information to be the subject of transmission control includes packetized image data and audio data that have been encoded, for example.

The reception controller 371 controls the reception of information from other communication devices (for example, the television display device 150) by wireless communication. The information to be the subject to reception control includes coordinate information that is the operation result of cursor information, for example.

The wireless-LAN screen transfer application 302 invokes the discovery layer 303 and the RTSP/RTCP layer 304, and with the television display device 150, performs the control up to the start of the transmission of screen data. Furthermore, the wireless-LAN screen transfer application 302 invokes the RTSP/RTCP layer 304, and performs the control on data transmission and reception (for example, transferring screen data) with the television display device 150. The wireless-LAN screen transfer application 302 further performs the control at the time of finishing the transmission of screen data.

The wireless-LAN screen transfer application 302 comprises a pointing device controller 352, and also performs the control of cursor information displayed on the screen.

The pointing device controller 352 performs not only the control of cursor position based on the information from the pointing device driver 301 but also the control of cursor position based on the coordinate information from the television display device 150. Thus, the cursor position is controlled with both the pointing device 101 connected to the information processing device 100 and the pointing device 151 connected to the television display device 150.

That is, in the first embodiment, the pointing device controller 352 stores in the pointing device information 321 the latest coordinate information out of the coordinate information on the cursor based on the relative amount of change that the pointing device driver 301 received and the coordinate information transmitted from the television display device 150, and controls the position of the cursor. Then, in the information processing device 100, the screen data in which the cursor is displayed at a position indicated by the pointing device information 321 is generated. The generated screen data is displayed, and via the transmission controller 372, the screen data is transmitted to the television display device 150.

Figure 4:
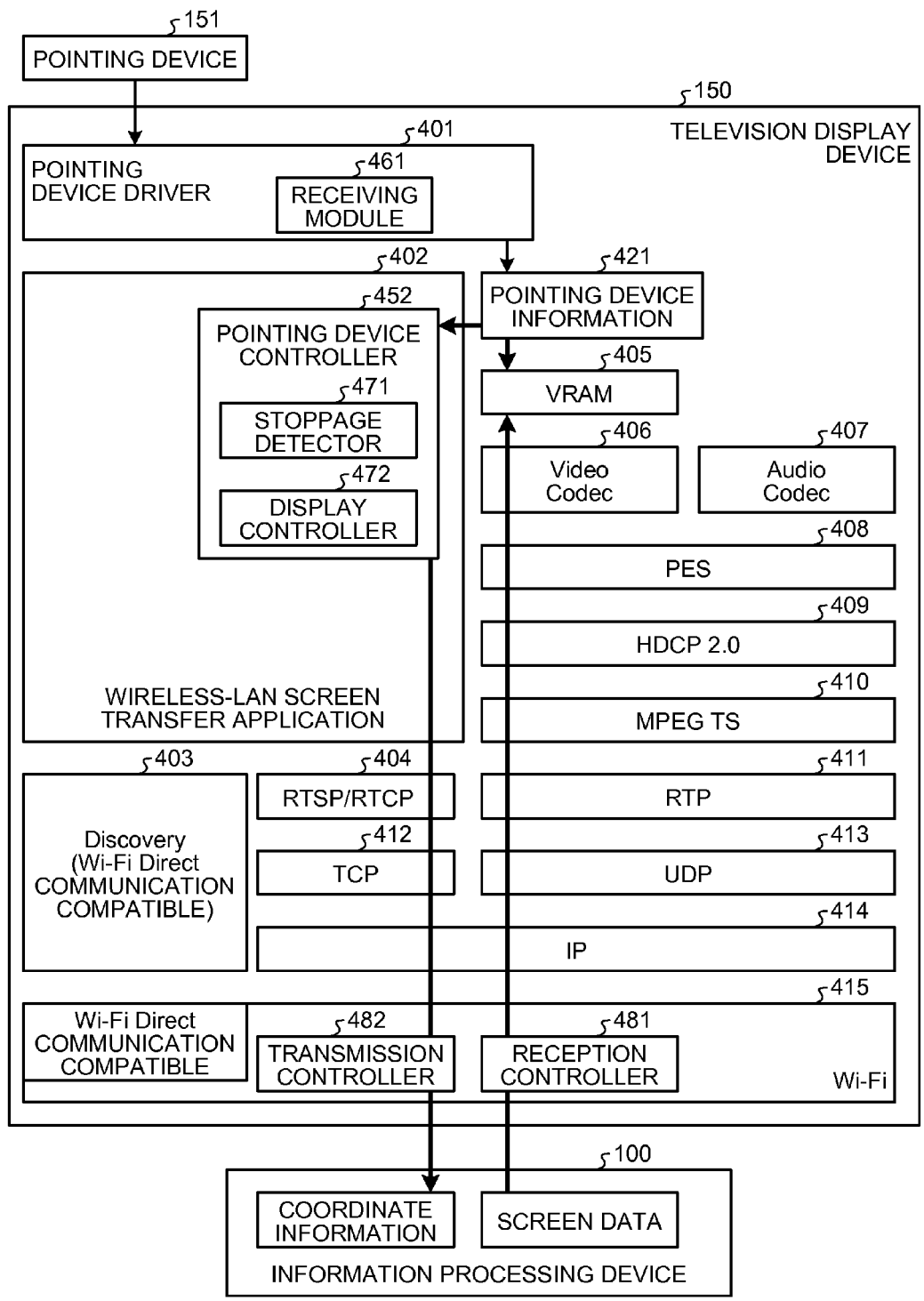
FIG. 4 is an exemplary diagram illustrating the structure of a communication protocol stack of the television display device in the first embodiment.

FIG. 4 is a diagram illustrating the structure of a communication protocol stack of the television display device 150 in the first embodiment. As illustrated in FIG. 4, the television display device 150 comprises a pointing device driver 401 to make the pointing device 151 usable. In the television display device 150, in a lower hierarchy than the pointing device driver 401, a group of software for transferring screen data via a wireless LAN is provided in a hierarchical manner.

As illustrated in FIG. 4, the television display device 150 comprises, as the group of software, a wireless-LAN screen transfer application 402, a discovery layer 403, an RTSP/RTCP layer 404, a VRAM 405, a video_codec layer 406, an audio_codec layer 407, a PES layer 408, an HDCP_2.0 layer 409, an MPEG_TS layer 410, an RTP layer 411, a TCP layer 412, a UDP layer 413, an IP layer 414, and a Wi-Fi (IEEE802.11n) layer 415, and provides approximately the same functions as those of the group of software that the information processing device 100 comprises. Thus, explanations of the same functions as those of the group of software of the information processing device 100 are omitted. Besides, "layer" and "_" are omitted in FIG. 4.

The pointing device driver 401 comprises a receiving module 461 and is defined as the software that provides an interface for controlling the pointing device 151.

The receiving module 461, when screen data received from the information processing device 100 via a network is displayed, receives the operation on the cursor represented on the screen data.

Figure 5:
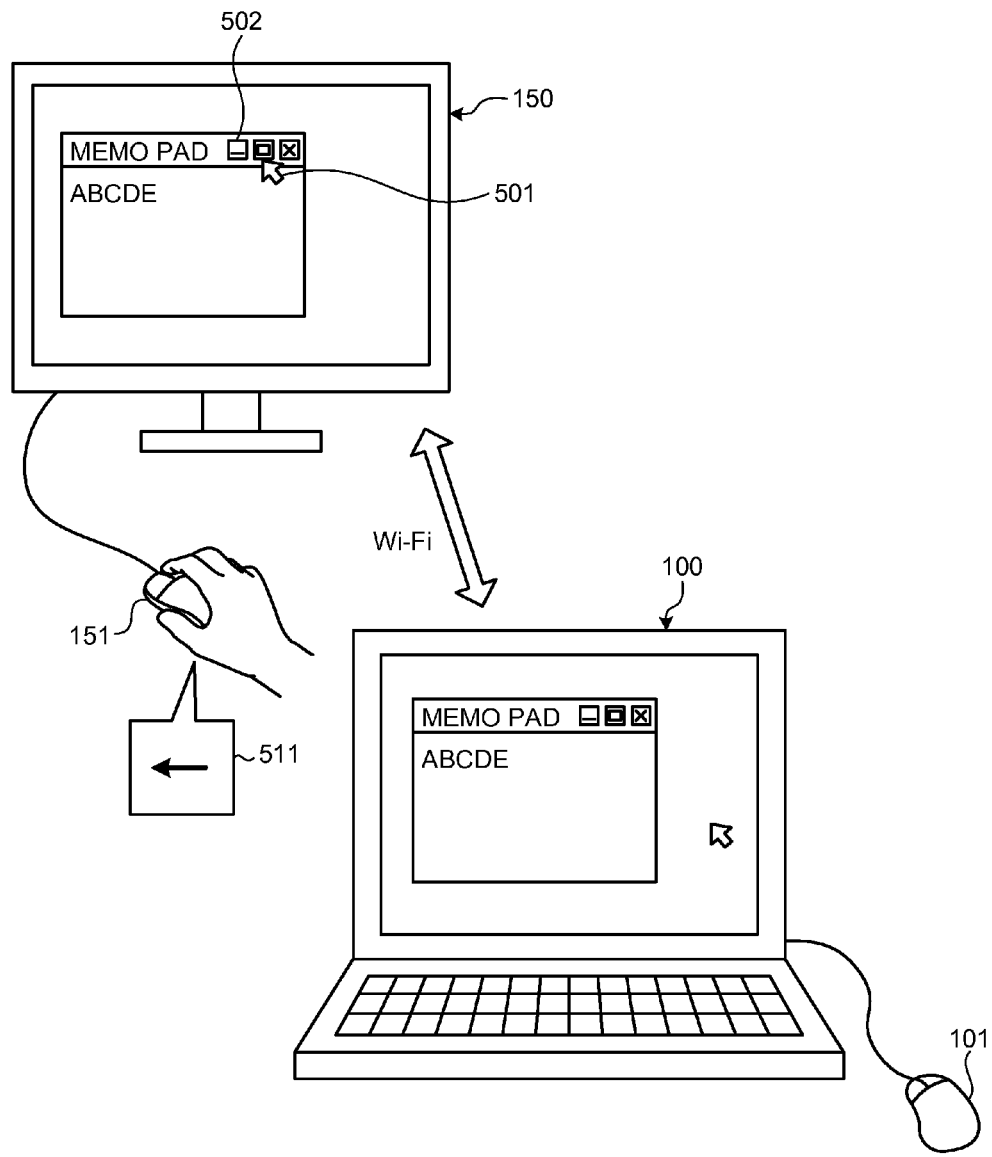
FIG. 5 is an exemplary diagram illustrating an example in which the television display device receives cursor operation performed by using a pointing device connected thereto in the first embodiment.

FIG. 5 is a diagram illustrating an example in which the television display device 150 receives cursor operation performed by using the pointing device (for example, a mouse) 151 connected thereto while screen data is transferred from the information processing device 100 to the television display device 150 via a wireless LAN.

As illustrated in FIG. 5, with screen data transferred by the information processing device 100 and with the transferred screen data displayed by the television display device 150, the same screen is displayed on the information processing device 100 and the television display device 150. Subsequently, the user performs, by using the pointing device 151 connected to the television display device 150, operation illustrated in a section 511, that is, operation to move a cursor 501 to a button 502. In this case, the coordinate information on the moved cursor is transmitted from the television display device 150 to the pointing device controller 352 of the information processing device 100 via an RTSP connection. Consequently, the same processing as the operation made with the pointing device 101 connected to the information processing device 100 is performed.

Then, the screen data on which the coordinates of the cursor have been reflected is transmitted from the information processing device 100 to the television display device 150. However, because the transferring time of the coordinate information from the television display device 150 (sink side) to the information processing device 100 (source side), the encoding processing time of the information processing device 100, and the decoding processing time of the television display device 150 are to be causes of delay, there occurs a considerable delay until the cursor represented on the screen of the television display device 150 moves after the pointing device 151 on the television display device 150 is operated. As a result, the user feels a sense of discomfort during operation with pointing device.

Figure 6:
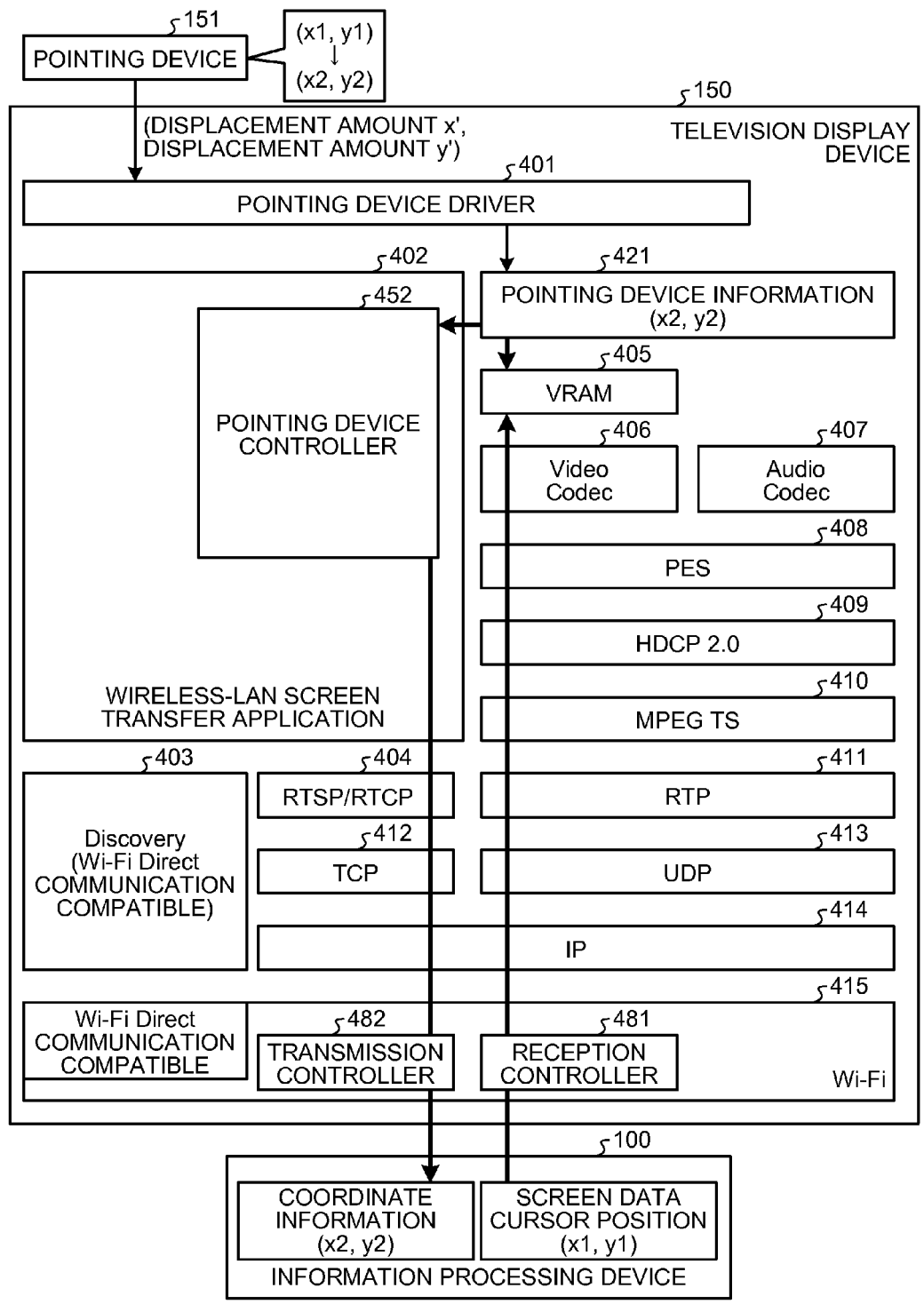
FIG. 6 is an exemplary diagram illustrating the transmission and reception of information performed in the television display device when the pointing device is operated in the first embodiment.

FIG. 6 is a diagram illustrating the transmission and reception of information performed in the television display device 150 when the pointing device 151 is operated. In the example illustrated in FIG. 6, it is assumed that the operation by the user to move the pointing device 151 from the coordinates (x1, y1) to the coordinates (x2, y2) has been received. In this case, the pointing device driver 401 receives the amount of displacement (displacement amount x', displacement amount y') from the pointing device 151.

In accordance with the amount of displacement, the coordinate information (x2, y2) is stored in pointing device information 421. Consequently, a pointing device controller 452 transmits the coordinate information (x2, y2) to the information processing device 100 via a transmission controller 482.

After such processing is performed, it takes time until the information processing device 100 generates screen data with the coordinate information (x2, y2) of the cursor. Thus, even though the user has moved the cursor up to the coordinates (x2, y2), the screen data for which the position of the cursor is the coordinates (x1, y1) is transmitted from the information processing device 100.

Figure 7:
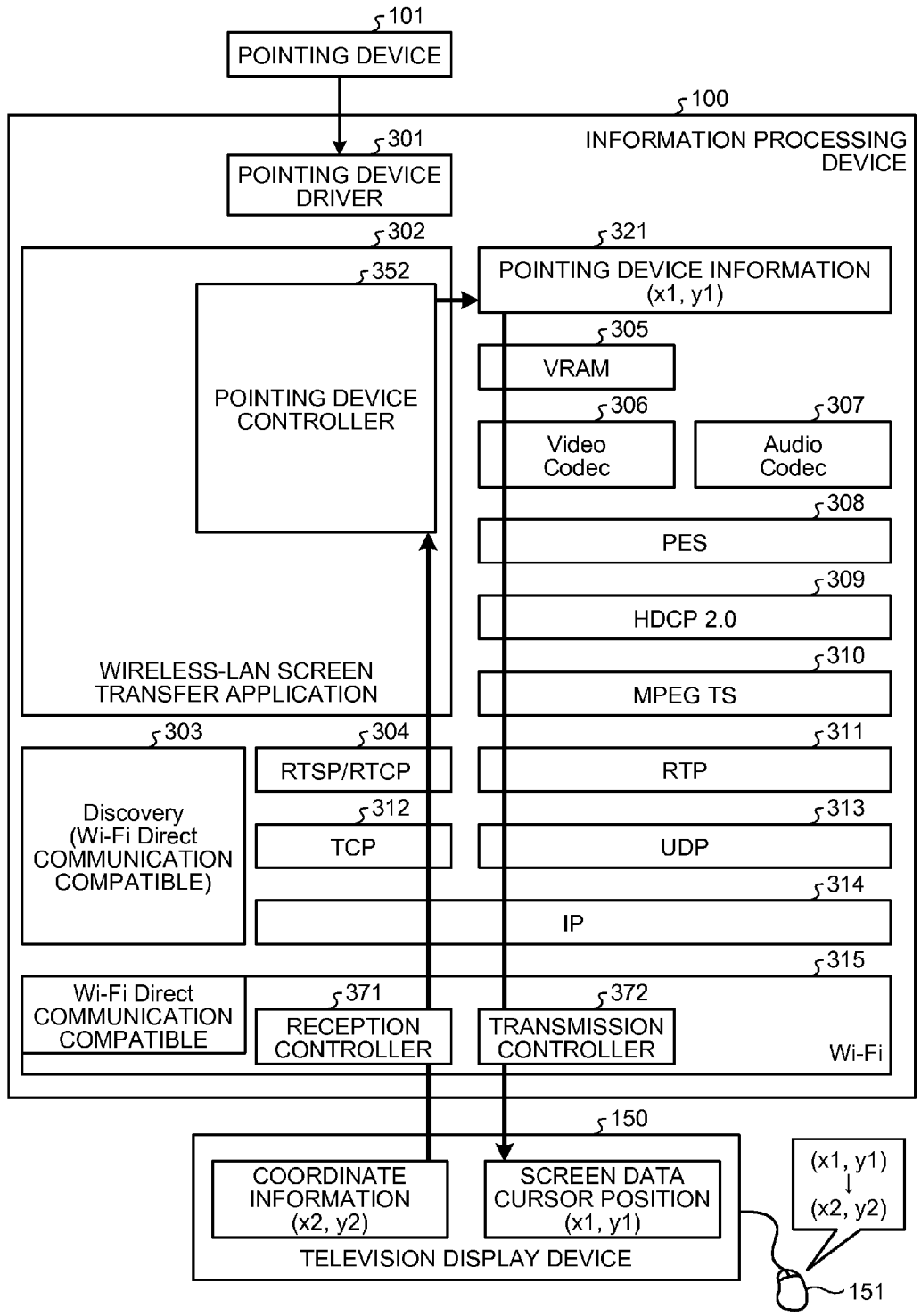
FIG. 7 is an exemplary diagram illustrating the transmission and reception of information performed in the information processing device when the pointing device is operated on the television display device in the first embodiment.

FIG. 7 is a diagram illustrating the transmission and reception of information performed in the information processing device 100 when the pointing device 151 is operated on the television display device 150. In the example illustrated in FIG. 7, it is assumed that the operation to move the pointing device 151 from the coordinates (x1, y1) to the coordinates (x2, y2) has been received in the television display device 150. Along with this, although the information processing device 100 has received the new coordinate information (x2, y2) of the cursor from the television display device 150, the illustrated state is such that the pointing device information 321 is not yet notified of that.

The information processing device 100 in the first embodiment performs the cursor control from both the coordinate information received from the television display device 150 and the operation of the pointing device 101 received by the pointing device driver 301. In the example illustrated in FIG. 7, because the coordinate information has been received from the television display device 150, the information processing device 100 performs the cursor control in accordance with the coordinate information.

However, until the coordinate information (x2, y2) is stored in the pointing device information 321, the screen data is generated based on the cursor position (x1, y1) stored in the pointing device information 321 and is continued to be transmitted to the television display device 150 by the transmission controller 372. Furthermore, even when the coordinate information (x2, y2) is stored in the pointing device information 321, the generated screen data needs to be encoded in the video_codec layer 306 before being transmitted to the television display device 150. This encoding also takes time. Consequently, it takes time until the operation performed on the television display device 150 and received by the receiving module 461 of the pointing device driver 401 is reflected on the screen data.

Hence, the television display device 150 in the first embodiment is configured to display a different cursor based on the operation with the pointing device 151, in superimposition on the screen data received from the information processing device 100.

Referring back to FIG. 4, the configuration to perform the foregoing processing will be described. The pointing device controller 452 comprises a stoppage detector 471 and a display controller 472, and performs the control concerning the position of the cursor stored in the pointing device information 421.

The display controller 472, when the receiving module 461 receives operation to move the pointing device 151, superimposes and displays a unique cursor that is moved in accordance with the moving operation, on the screen data on which the cursor is represented.

Figure 8:
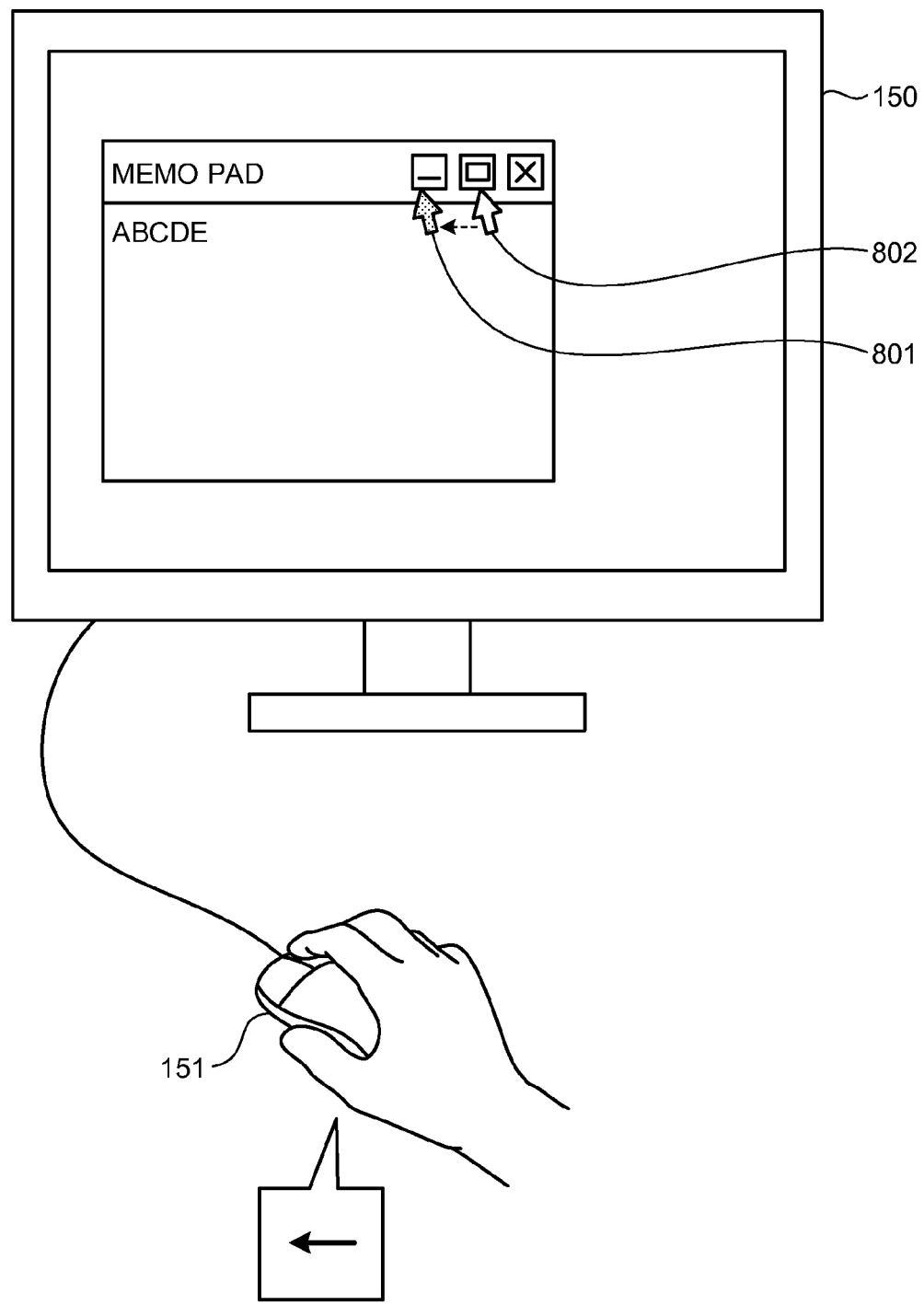
FIG. 8 is an exemplary diagram illustrating a first example of a screen displayed on the television display device when the pointing device is operated in the first embodiment.

FIG. 8 is a diagram illustrating a first example of a screen displayed on the television display device 150 in the first embodiment when the pointing device 151 is operated. The screen example illustrated in FIG. 8 is an example assuming that operation to move a cursor 802 leftward has been performed. Even when such a moving operation has been performed, it takes time until the operation is reflected on the screen, and the cursor 802 therefore continues to stand still. However, as illustrated in FIG. 8, the display controller 472 newly generates a unique cursor 801 on which the received moving operation is reflected, and displays the unique cursor 801 in superimposition on the screen data received from the information processing device 100. Because the unique cursor 801 is controlled within the television display device 150, it is displayed without being delayed.

The unique cursor 801 is configured to have a display form different from that of the cursor 802 within the screen data. For example, when the cursor 802 is white, it is conceivable that the unique cursor 801 is configured to be yellow. Consequently, the user can recognize that the cursor within the screen data and the newly generated unique cursor are different. The color of the unique cursor may be any color as long as it is different from the color of the cursor within the screen data.

The transmission controller 482 then transmits the coordinate information indicative of the position of the cursor that is stored in the pointing device information 421 to the information processing device 100. Consequently, after the unique cursor 801 is moved, the cursor within the screen data is displayed to follow the move.

Figure 9:
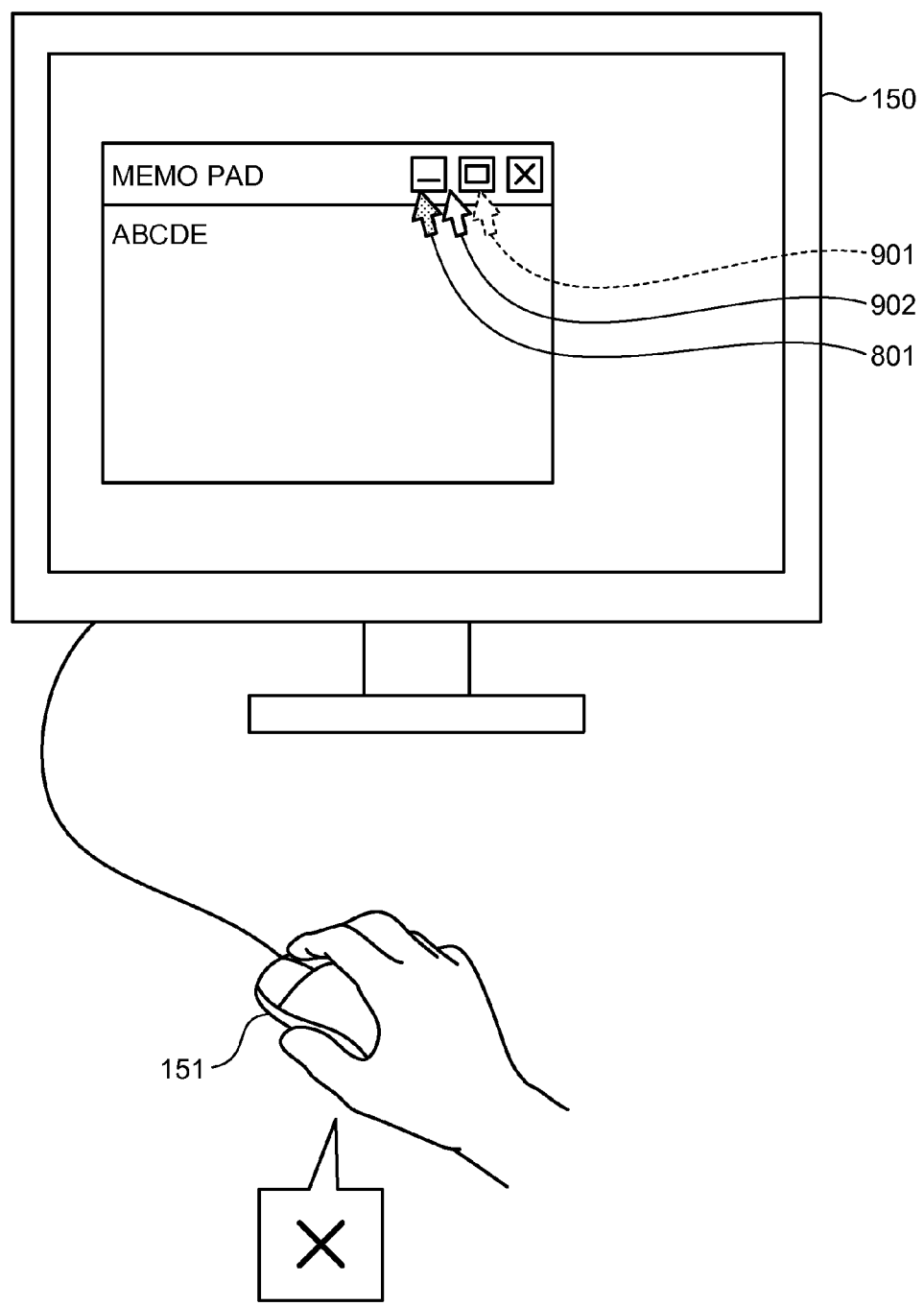
FIG. 9 is an exemplary diagram illustrating a second example of the screen displayed on the television display device when the pointing device is operated in the first embodiment.

FIG. 9 is a diagram illustrating a second example of a screen displayed on the television display device 150 in the first embodiment when the pointing device 151 is operated. The screen example illustrated in FIG. 9 is an example assuming that the moving operation of the pointing device 151 has been stopped after moving to the unique cursor 801. Thereafter, the screen data continuing to be transmitted from the information processing device 100 is affected by the above-described delay, animation of the cursor is displayed in order at positions 901 and 902 so as to follow the unique cursor 801 that has finished moving.

The cursor in the screen data transmitted from the information processing device 100 is displayed while being delayed from the actual operation of the pointing device 151. Thus, when the user operates the pointing device 151, the cursor in the screen data transmitted from the information processing device 100 is displayed as if it is chasing the unique cursor 801 that is directly displayed by the television display device 150.

Figure 10:
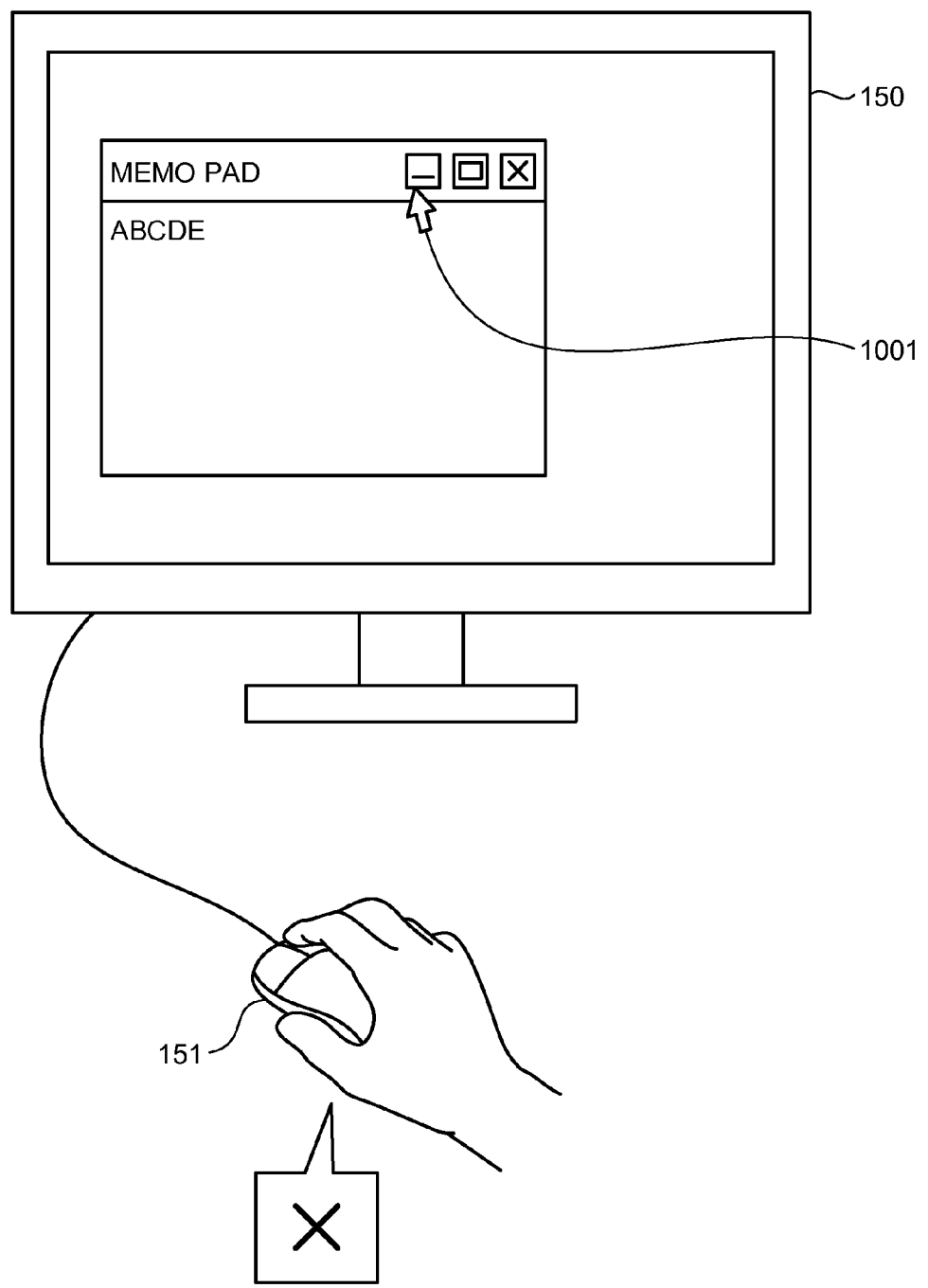
FIG. 10 is an exemplary diagram illustrating a third example of the screen displayed on the television display device when the pointing device is operated in the first embodiment.

FIG. 10 is a diagram illustrating a third example of a screen displayed on the television display device 150 in the first embodiment when an operation of the pointing device 151 is performed. The screen example illustrated in FIG. 10 is an example assuming that, because the displacement between the position of a cursor 1001 that has been delayed and the position of the unique cursor 801 that has been displayed up to FIG. 9 no longer occurs, the unique cursor has been hidden by the display controller 472 of the television display device 150.

Specifically, in the first embodiment, the stoppage detector 471 of the pointing device controller 452 detects the stoppage of operation to move the pointing device 151.

When the stoppage detector 471 detected the stoppage of operation to move the pointing device 151, the display controller 472 then controls hiding of the unique cursor 801 in response to the detection. Consequently, when the screen data on which the moving operation is reflected is displayed, the unique cursor 801 is turned into a hidden state. The display controller 472 in the first embodiment turns the unique cursor 801 into a hidden state, after a given time has elapsed from the detection of the stoppage of operation to move the pointing device 151 by the stoppage detector 471. It is conceivable that the given time is determined based on a time that is required until the movement of the cursor is reflected on the screen data after the moving of the cursor was performed, for example. However, it is not limited to such a time, and a time that is required for the encoding and decoding that have a significant influence on the delay may be set as the given time, for example.

Furthermore, the first embodiment is not limited to the method in which the unique cursor is turned into a hidden state after a given time has elapsed from the detection of the stoppage. As a first modification, the display controller 472 may turn the unique cursor into a hidden state when the stoppage detector 471 detected the stoppage of moving operation of the pointing device 151. Even in such a case, because the user can recognize the position of the stopped cursor, the burden of operation can be reduced.

Conceivable as a second modification is a method that keeps a time (delay time) calculated that has been taken to reflect the moving operation of the pointing device 151 on the screen data after the moving operation, by causing the information processing device 100 and the television display device 150 to perform communication therebetween in advance. The calculation method of the delay time is not limited to conventionally used methods, and any method may be used.

The display controller 472 according to the second modification turns the unique cursor into a hidden state with the elapse of the (calculated) delay time as a trigger, after the stoppage of the moving operation of the pointing device 151 is detected by the stoppage detector 471 and the coordinate information is transmitted to the information processing device 100.

In the television display device 150 in the first embodiment, when the operation of the pointing device 151 is performed, two cursors of the cursor in the screen data and the unique cursor are displayed. In this case, when the user performs an operation such as a right-click or left-click, it is difficult to recognize the position coordinate of which cursor has been selected. Hence, the display controller 472 in the first embodiment is to make the display form of the unique cursor different such that it can be recognized that the operation was performed at the position indicated by the unique cursor when the operation such as a right-click or left-click was performed.

Figure 11:
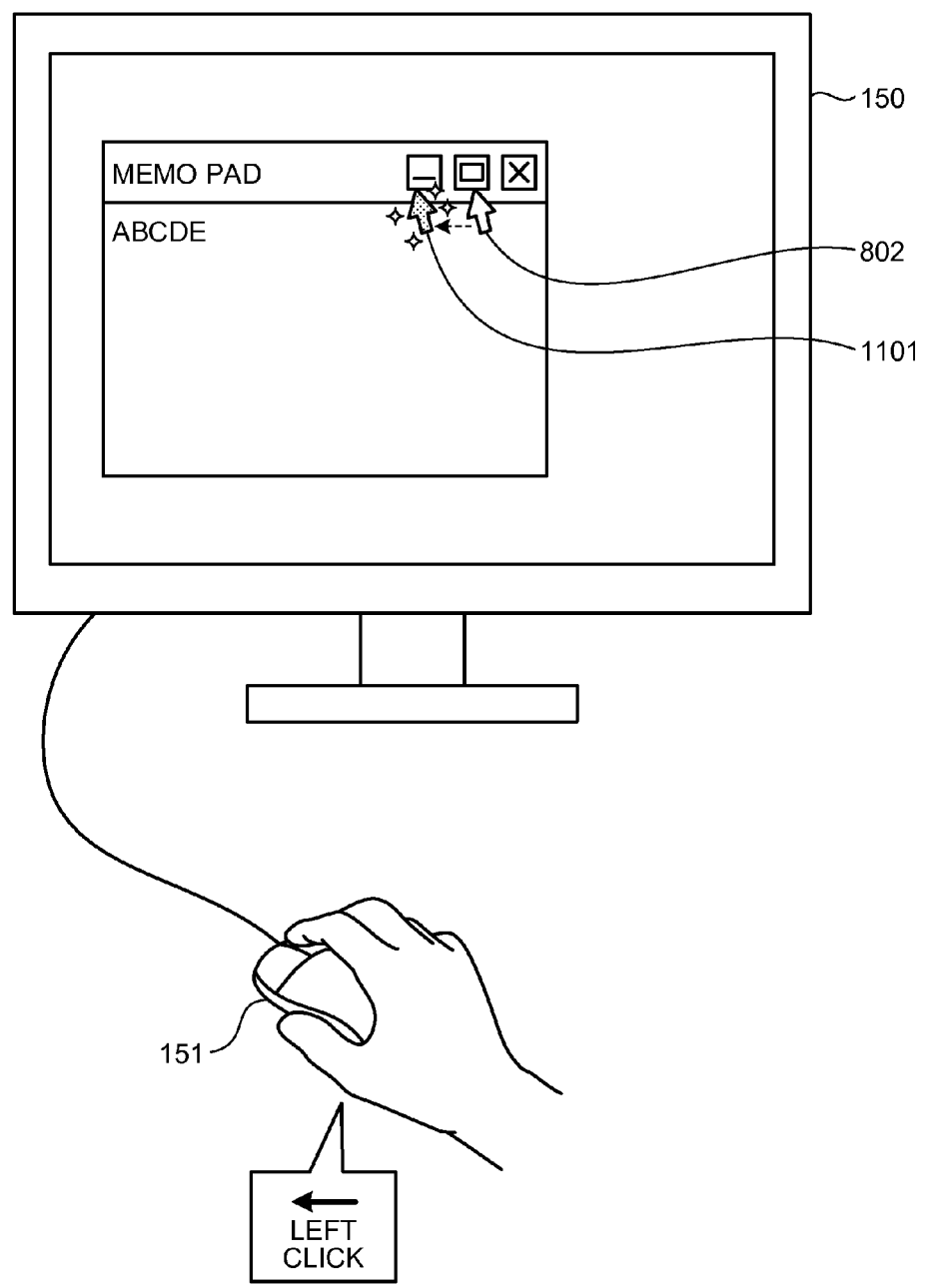
FIG. 11 is an exemplary diagram illustrating an example of a screen displayed on the television display device when a button on the pointing device is pressed in the first embodiment.

FIG. 11 is a diagram illustrating a screen example displayed on the television display device 150 in the first embodiment when a button press of the pointing device 151 is performed. As illustrated in FIG. 11, with the reception of pressing operation of the pointing device 151 by the receiving module 461 as a trigger, the display controller 472 performs animation display of a unique cursor 1101. The example illustrated in FIG. 11 is an example assuming that animation such as blinking stars around the unique cursor 1101 is displayed, in response to the pressing operation performed after the operation to move the cursor 802 leftward is performed. The displayed animation may be in any form, and animation such as a button being pressed may be displayed, for example. The animation display can let the user recognize that the operation is being made at the position indicated by the unique cursor 1101, but not on the cursor in the screen data to which a delay is occurring.

Figure 12:
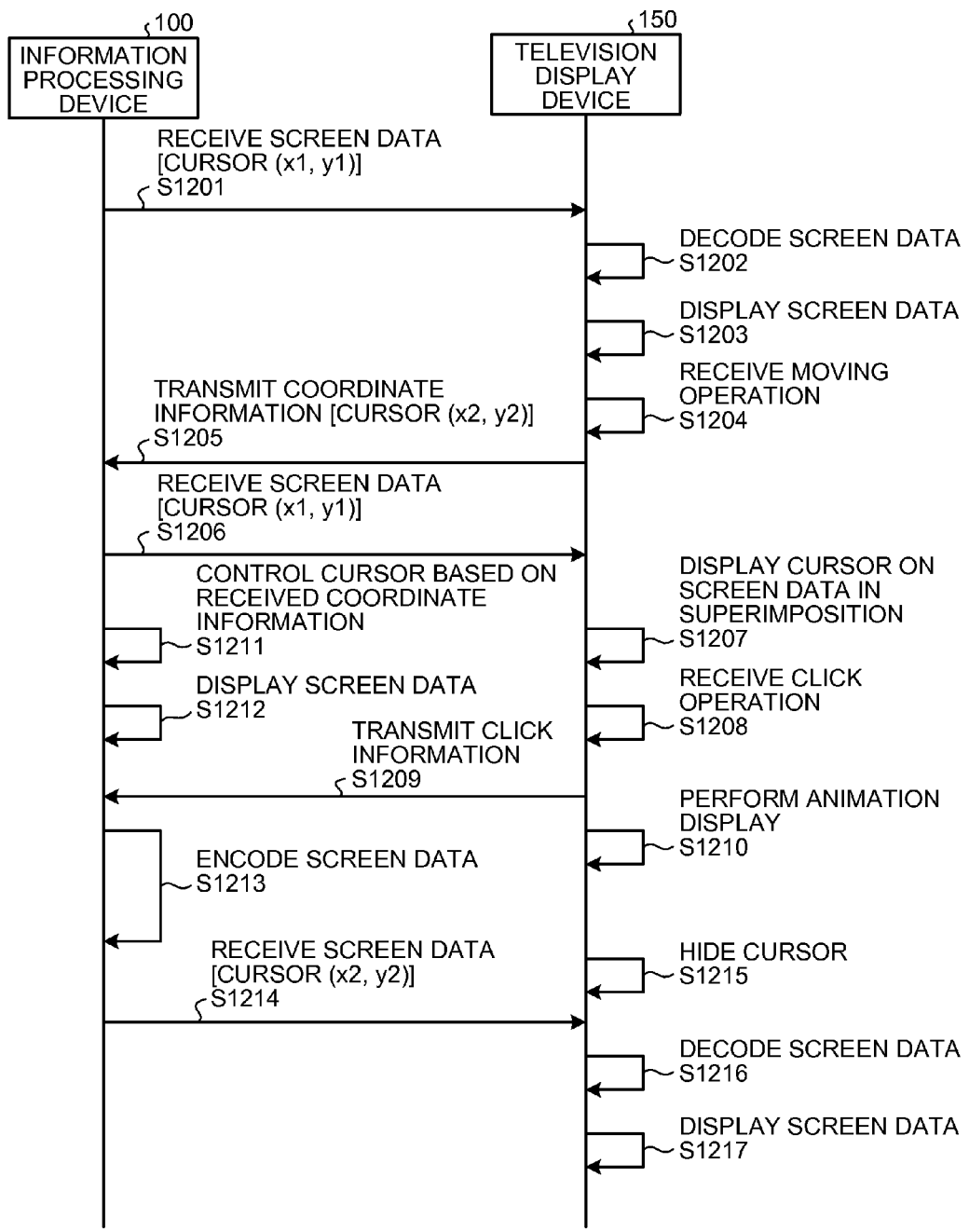
FIG. 12 is an exemplary sequence diagram illustrating a procedure of screen display processing performed in the information processing device and the television display device in the first embodiment.

Next, described is the processing of screen display performed in the information processing device 100 and the television display device 150 in the first embodiment. FIG. 12 is a sequence diagram illustrating a procedure of the above-described processing performed in the information processing device 100 and the television display device 150 in the first embodiment.

First, the television display device 150 receives screen data that has been encoded from the information processing device 100 (S1201). The position of the cursor in the screen data is assumed to be the coordinates (x1, y1).

When the television display device 150 receives the screen data, the video_codec layer 406 in the television display device 150 performs decoding of the screen data (S1202). The video processor 210 in the television display device 150 then displays the screen data that has been decoded, on the display device 211 (S1203). Subsequently, in the television display device 150, the receiving module 461 receives a moving operation performed with the pointing device 151 for the displayed screen data (S1204).

Consequently, the transmission controller 482 transmits the coordinate information (x2, y2) indicative of the position on which the moving operation has been performed, in accordance with the control of the pointing device controller 452 (S1205).

However, a reception controller 481 of the television display device 150 receives the screen data on which the transmitted coordinate information (x2, y2) is not yet reflected (S1206). The position of the cursor in the screen data is assumed to be the coordinates (x1, y1) also.

Consequently, the display controller 472 of the television display device 150 displays a unique cursor on which the moving operation received by the receiving module 461 was reflected, in superimposition on the received screen data (S1207). Afterward, the receiving module 461 receives a click operation on the pointing device 151 (S1208).

The transmission controller 482 then transmits, in accordance with the control from the pointing device controller 452, click information indicative of having been clicked to the information processing device 100 (S1209). Furthermore, the display controller 472 performs animation display of the unique cursor (S1210).

Correspondingly, the pointing device controller 352 of the information processing device 100 performs the cursor control based on the received coordinate information (S1211). The information processing device 100 then displays the screen data on which the cursor control has been performed (S1212), and the video_codec layer 306 encodes the screen data (S1213).

The reception controller 481 then receives the encoded screen data from the information processing device 100 (S1214). The position of the cursor in the screen data is assumed to be the coordinates (x2, y2).

Correspondingly, in the television display device 150, after a given time has elapsed from the detection of the stoppage of the moving operation by the stoppage detector 471, the display controller 472 turns the unique cursor into a hidden state (S1215).

When the television display device 150 receives the screen data, the video_codec layer 406 in the television display device 150 performs decoding of the screen data (S1216). The video processor 210 in the television display device 150 then displays the screen data that has been decoded (S1217).

By the foregoing processing procedure, in accordance with the operation performed on the television display device 150, the cursor display can be performed in the information processing device 100 and the television display device 150.

Modification of First Embodiment

The foregoing first embodiment has described an example of the display control of a cursor in a color different from the cursor in the screen data when the operation with the pointing device 151 is received. However, it is not limited to displaying a cursor of a different color, and the display form only needs to be different to the extent that the cursor is identifiable.

Figure 13:
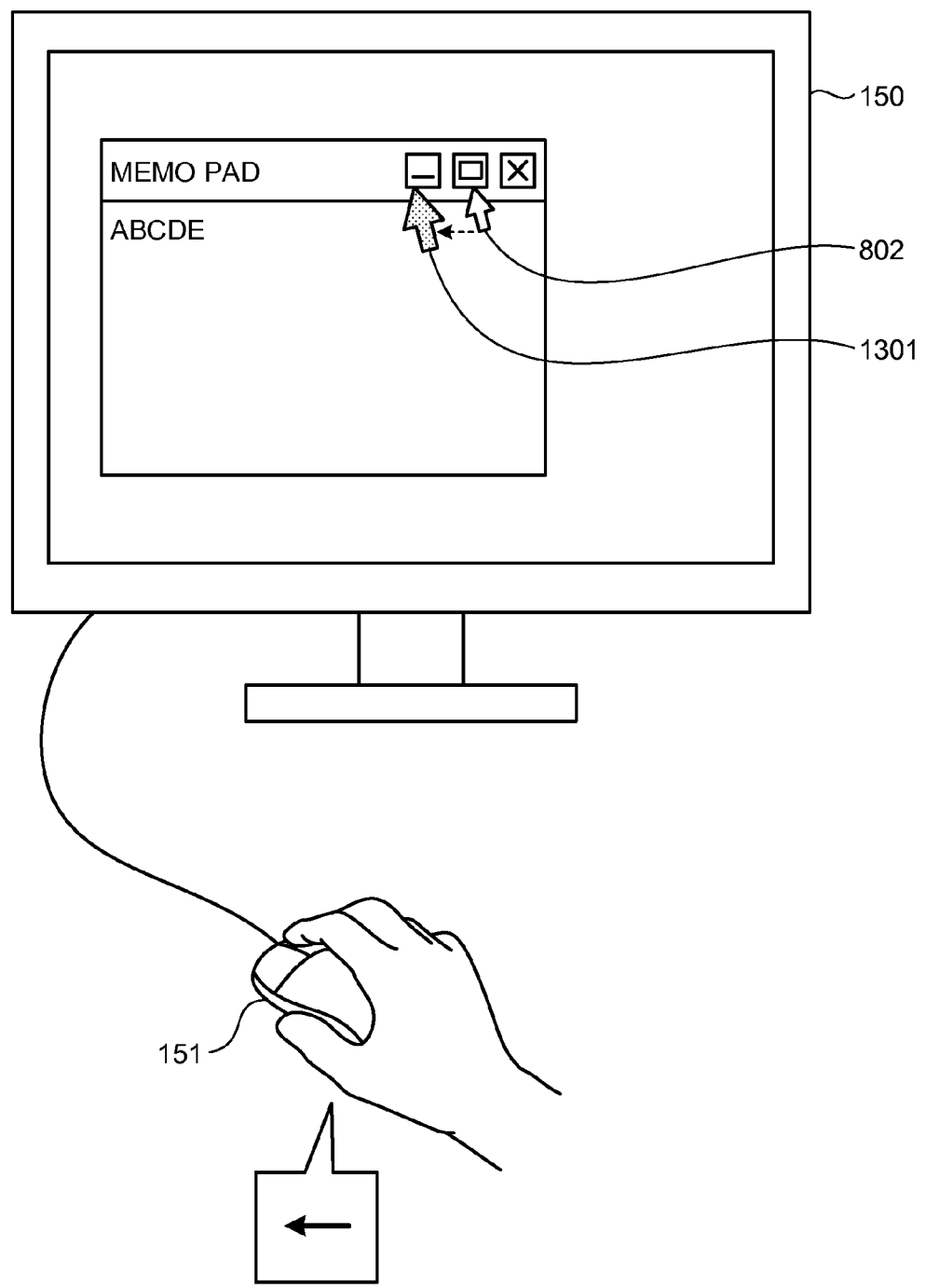
FIG. 13 is an exemplary diagram illustrating an example of a screen displayed on a television display device when a pointing device is operated according to a modification of the first embodiment.

FIG. 13 is a diagram illustrating an example of a screen displayed on the television display device 150 according to a modification of the first embodiment when the pointing device 151 is operated. The screen example illustrated in FIG. 13 is an example assuming that operation to move the cursor 802 leftward has been performed. Even in the modification, as the same as that in the first embodiment, the display controller 472 displays a unique cursor 1301. In the example illustrated in FIG. 13, the unique cursor 1301 that is larger in size than the cursor 802 is displayed. With this, the user can recognize that it is a cursor newly generated in response to the operation of the user.

As in the foregoing, displaying a unique cursor in a size different from the cursor in the screen data can let the user recognize the difference between the unique cursor and the cursor in the screen data. The unique cursor is not limited to being made larger than the cursor in the screen data, and the unique cursor and the cursor in the screen data only need to be different from each other in any one or more of the size and shape. The color may also be made different as in the first embodiment.

Second Embodiment

The above-described first embodiment and the modifications thereof have described examples of turning the unique cursor into a hidden state upon detection of the stoppage of the moving operation of the pointing device 151. However, the hiding of the unique cursor is not limited to the detection of the stoppage of the moving operation. Hence, in a second embodiment, an example is assumed in which the display controller 472 turns the unique cursor into a hidden state when the cursor in the screen data and the unique cursor are in an overlapping state (superimposed state).

In the second embodiment, the pointing device controller 452 refers to the VRAM 405 in which screen data is stored, and detects the position coordinates of the cursor in the screen data. The pointing device controller 452 then determines whether the position coordinates of the detected cursor coincide with the position coordinates of the unique cursor.

If the pointing device controller 452 determines that the position coordinates of the detected cursor coincides with the position coordinates of the unique cursor, in other words, the unique cursor and the cursor in the screen data has been brought into an overlapping state (superimposed), the display controller 472 turns the unique cursor into a hidden state.

Third Embodiment

A third embodiment is an example in which the buffering of screen data of the television display device 150 is switched. It is assumed that the television display device 150 is of a model in which a game mode for which display delay is small is selectable from a video setting menu or the like. The game mode is defined as a mode (low-latency display mode) in which the buffering of screen data is inhibited so as to shorten the time it takes to reflect an operation result on the screen when the operation is performed.

Hence, the television display device 150 according to the third embodiment switches to a low-latency display mode automatically when the operation of the pointing device 151 is started. Consequently, the delay that occurs between the unique cursor and the cursor in the screen data is made as small as possible.

When the operation of the pointing device 151 is then finished, the low-latency display mode is switched to a normal display mode. In the third embodiment, by performing such processing, the delay time until finishing the moving of the cursor in the television display device 150 can be shortened further.

The above-described embodiments and modifications have described the situations in which the screen data is generated by the information processing device 100 and the pointing device 151 of the television display device 150 is operated. However, an applicable situation is not limited to such embodiments, and it may be applied to a situation in which the screen data is generated by the television display device 150 and the pointing device 101 of the information processing device 100 is operated. Furthermore, an applicable situation is not limited to the combination of a television display device and an information processing device, and it may be processing among a plurality of television display devices or among a plurality of information processing devices.

In the above-described embodiments and modifications, when operation of the pointing device (for example, a mouse) 151 connected to the television display device 150 is performed, a unique cursor corresponding to the operation is to be displayed on the television display device 150 side, in superimposition on the screen data received from the information processing device 100. Consequently, because the information processing device 100 does not intervene for the display of the unique cursor, a display delay can be suppressed. This can improve the operability.

That is, in the above-described embodiments and modifications, although the delay time until displaying the screen data by the television display device 150 is not changed, the operability can be improved by a unique cursor displayed to be operable. Furthermore, because a delay does not occur when operation is performed, a sense of discomfort can be suppressed.

Moreover, in the above-described embodiments, with the stoppage of moving operation as a trigger, the unique cursor was turned into a hidden state. Only the cursor in the screen data is thus displayed, and the pointing device 151 and the cursor are brought into a mutually synchronized state. Consequently, operability without a sense of discomfort can be achieved.

The pointing-device control program executed by the information processing device 100 or the television display device 150 in the above-described embodiments is provided in a file of an installable format or an executable format recorded on a computer readable recording medium such as a compact disc read only memory (CD-ROM), a flexible disk (FD), a CD recordable (CD-R), and a digital versatile disc (DVD).

The pointing-device control program and the pointing device driver executed by the communication device or the television display device in the above-described embodiments may be configured to be stored on a computer connected to a network such as the Internet and provided by downloading via the network. The pointing-device control program and the pointing device driver executed by the communication device or the television display device in the above-described embodiments may be configured to be provided or distributed via a network such as the Internet.

The pointing-device control program and the pointing device driver in the embodiments may be configured to be provided by embedding in a ROM or the like in advance.

The pointing-device control program and the pointing device driver executed by the information processing device or the television display device in the above-described embodiments are modularly configured including the above-described various modules (the receiving module, the stoppage detector, the display controller, the transmission controller, and the reception controller), and as the actual hardware, are configured such that, by reading out and executing the pointing device control program and the pointing device driver from the foregoing storage medium by the CPU (processor), the above-described various modules are loaded on a main storage device, and the receiving module, the stoppage detector, the display controller, the transmission controller, and the reception controller are generated on the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first display;
receiver circuitry configured to receive data of a first screen comprising a first cursor at a first position via a network from a second electronic apparatus, wherein the first screen is an image displayed on a second display of the second electronic apparatus, and a position of the first cursor is controlled by a pointing device of the second electronic apparatus;
display circuitry configured to display the first screen on the first display;
a user interface configured to receive positional information in accordance with a user operation;
transmitter circuitry configured to transmit the positional information,
wherein
the display circuitry is further configured to display a second screen comprising the first cursor at a second position different from the first position, the second position determined based on both the positional information and the first position;
the receiver circuitry is further configured to receive a third screen comprising the first cursor at a third position via the network from the second electronic apparatus while the second screen is displayed on the first display; and
the display circuitry is further configured to hide the first cursor at the second position and display the third screen.

2. The electronic apparatus of claim 1, wherein the display circuitry is further configured to hide the first cursor at the second position, when the user operation is stopped.

3. The electronic apparatus of claim 1, wherein the display circuitry is further configured to hide the first cursor at the second position, when a first time has elapsed after the user operation is stopped.

4. The electronic apparatus of claim 1, wherein
the display circuitry is further configured to hide the first cursor at the second position, when a second time has elapsed after the user operation is stopped, and
the second time is calculated as a delay until reception of the third screen on which the positional information is reflected after the positional information was transmitted to the second electronic apparatus.

5. The electronic apparatus of claim 1, wherein
the user interface further receives a press of a given button while the first cursor is superimposed and displayed on the third screen, and
the display circuitry is further configured to performs animation display of the first cursor with reception of the press of the given button.

6. A display control method comprising:
receiving data of a first screen comprising a first cursor at a first position via a network from a second electronic apparatus, wherein the first screen is an image displayed on a second display of the second electronic apparatus, and a position of the first cursor is controlled by a pointing device of the second electronic apparatus;
displaying the first screen on the first display;
receiving positional information in accordance with a user operation;
transmitting the positional information;
displaying a second screen comprising the first cursor at a second position different from the first position, the second position determined based on both the positional information and the first position;
receiving a third screen comprising the first cursor at a third position via the network from the second electronic apparatus while the second screen is displayed on the first display
hiding the first cursor at the second position and display the third screen.

7. The display control method of claim 6, wherein
the hiding including hiding the first cursor at the second position, when the user operation is stopped.

8. The display control method of claim 6, wherein
the hiding including hiding the first cursor at the second position, when a first time has elapsed after the user operation is stopped.

9. The display control method of claim 6, wherein
the hiding including hiding the first cursor at the second position, when a second time has elapsed after the user operation is stopped, and
the second time is calculated as a delay until reception of the third screen on which the positional information is reflected after the positional information was transmitted to the second electronic apparatus.

10. The display control method of claim 6, wherein
receiving a press of a given button while the first cursor is superimposed and displayed on the third screen, and
performing animation display of the first cursor with reception of the press of the given button.

* * * * *